US004001763B2

United States Statutory Invention Registration [19]

[11] Reg. Number: H1763

Mizusawa

[45] Published: Dec. 1, 1998

[54] MICROSCOPE OBJECTIVE LENS

[75] Inventor: Masayuki Mizusawa, Yokohama, Japan

[73] Assignee: Nikon Corporation, Tokyo, Japan

[21] Appl. No.: 805,472

[22] Filed: Feb. 25, 1997

[30] Foreign Application Priority Data

Feb. 28, 1996 [JP] Japan ..... 8-067223

[51] Int. Cl.[6] ..... G02B 21/02

[52] U.S. Cl. ..... 359/656

[58] Field of Search ..... 359/656–661, 359/684–685, 689, 350, 355–357

[56] References Cited

U.S. PATENT DOCUMENTS

| | | | |
|---|---|---|---|
| 3,799,680 | 3/1974 | Weisner | 359/381 |
| 4,666,256 | 5/1987 | Shimizu et al. | 359/658 |
| 5,444,573 | 8/1995 | Saito | 359/661 |
| 5,532,878 | 7/1996 | Suenaga et al. | 359/660 |

FOREIGN PATENT DOCUMENTS

| | | | |
|---|---|---|---|
| 61-275812 | 12/1986 | Japan | 359/661 |
| 6-250090 | 9/1994 | Japan | 359/658 |

OTHER PUBLICATIONS

English Abstract of Japanese reference No. 61–275,812, issued on Dec. 5, 1986.

English Abstract of Japanese reference No. 5–50517, issued on Mar. 5, 1991.

English Abstract of Japanese reference No. 5–119263, issued on May 18, 1993.

*Primary Examiner*—Daniel T. Pihulic

*Attorney, Agent, or Firm*—Klarquist Sparkman Campbell Leigh & Whinston, LLP

[57] ABSTRACT

Apochromatic-type microscope objective lenses are disclosed having a high numeral aperture number with few component lenses. The objective lenses are operable to correct any of various aberrations arising due to use of the objective lens with cover glasses having variable thickness. The objective lenses comprise a first positive lens group comprising a positive meniscus lens with a concave surface facing objectwise, a second positive lens group comprising a positive cemented lens in which the cemented surface has negative refractive power and a negative cemented lens in which the cemented surface has positive refractive power, and a third (negative) lens group comprising at least one cemented lens. The second and third lens groups are movable on the optical axis relative to the first lens group so as to facilitate correction of aberrations arising from use of cover glasses having variable thickness.

8 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MICROSCOPE OBJECTIVE LENS

FIELD OF THE INVENTION

This invention pertains to microscope objective lenses, especially apochromatic-type microscope objective lenses.

BACKGROUND OF THE INVENTION

Generally, microscope objective lenses are designed to be used with a cover glass (i.e., a clear, thin, flat, parallel-plane plate placed between the specimen and the objective lens) of a specific thickness. However, all cover glasses have some variation in thickness, and such variations in thickness can affect the lens performance. The effect of variable cover-glass thickness on lens performance is small if the numerical aperture (NA) of the objective lens is 0.5 or less, and can be pronounced with conventional objective lenses having a numerical aperture of greater than about 0.75.

With conventional objective lenses having a "high" numerical aperture (NA) (i.e., 0.85 or greater), be markedly deleterious, especially with respect to the focusing performance of the lens. This problem can render certain such lenses unsuitable for use.

With certain "brigjt" microscope objective lenses having a high numerical aperture, NA=0.85 or higher, a "correcting" lens group or "correcting ring" is sometimes employed to correct various aberrations arising from variable cover-glass thickness.

Examples of microscope objective lenses including correcting rings are disclosed, e.g., in Japanese *Kokai* patent document Nos. Sho 61-275812, Hei 3-50517, and Hei 5-119263.

The objective lenses disclosed in the *Kokai* '812 document comprises a first lens group having a positive refractive power, a second lens group comprising divergent cemented surfaces (i.e., surfaces having negative refractive power) as well as convergent cemented surfaces (i.e., surfaces having positive refractive power), and a third lens group with a negative refractive power. The second and third lens groups comprise a "correcting" lens group that is movable along the optical axis of the objective lens. This microscope objective lens has a numerical aperture NA=0.95, and can maintain nearly maximal brightness when used dry with a cover glass having a thickness range of 0.11 to 0.23 mm. However, such lenses have a problem with variation of chromatic difference of spherical aberration that arises whenever the correcting lens group is moved.

The objective lenses disclosed in the *Kokai* '517 document comprise, in order from the object side, a first lens group having positive refractive power, a second lens group having positive refractive power, and a third lens group having negative refractive power. The second lens group is movable along the optical axis and purportedly functions as a "correcting" lens group. Unfortunately, the second lens group is composed of four lens elements (three of which are cemented together to form a triplet and one simple lens element) which constitutes too many elements for the lens group to exhibit satisfactory performance as a correcting lens group. Also, the lens diameter is large, which tends to cause problems with aberrations (especially shifts toward the optical axis) arising from eccentricity.

The microscope objective lens disclosed in the *Kokai* '263 document has a numerical aperture NA=0.93 and includes a correcting lens group consisting of a cemented doublet lens. Unfortunately, however, there are too many lenses (thirteen) in the overall objective lens, which is prohibitively expensive.

SUMMARY OF THE INVENTION

The present invention addresses the shortcomings of the prior art discussed above. A key object of the invention is to provide a microscope objective lens having a large numerical aperture and that corrects aberrations, especially spherical aberrations, arising from variability in the cover-glass thickness. Another object is to provide an apochromatic-type microscope objective lens having a relatively small number of lenses and a high numerical aperture.

To such end, microscope objective lenses are provided, according to the invention, that comprise, in order from the object side, a first lens group G1 having a positive refractive power, a second lens group G2 having a positive refracive power, and a third lens group G3 having a negative refractive force. The first lens group G1 comprises a positive meniscus lens having a concave surface facing the object side. The second lens group G2 comprises a first cemented lens L21 with positive refractive power and including a negative lens L2n cemented to a positive lens L2p. The cemented surface has anegative refractive power. The second lens group G2 also comprises a second cemented lens L22 with negative refractive power and having a cemented surface with positive refractive power. The third lens group G3 has at least one cemented lens. The second lens group G2 and the third lens group G3 are axially movable together along the optical axis relative to the first lens group to correct any variable aberrations, especially spherical aberrations, arising from variability in the thickness of the cover glass.

The microscope objective lens of the invention also preferably satisfies the following conditional expressions:

$$0.33<n_{2n}-n_{2p} \quad (1)$$

$$0.02<D_{12}/f<1.3 \quad (2)$$

wherein $n_{2n}$ is the refractive index (relative to the D-line) of the negative lens L2n; $n_{2p}$ is the refractive index (relative to the D-line) of the positive lens L2p; $D_{12}$ is the axial distance (which can be varied) in air between the first lens group G1 and the second lens group G2; and f is the focal length of the objective lens.

The foregoing and additional features and advantages of the present invention will be more readily apparent from the following detailed description, which proceeds with reference to the accompanying drawings.

DETAILED DESCRIPTION

It is generally known that, in order to achieve the best flatness of the image plane, the Petzval sum of the lens should be at or nearly at zero. Certain telephoto lenses are known that achieve a low Petzval sum using a relatively simple configuration. Telephoto-type lenses comprising a front lens group having a positive refractive power and a rear lens group having a negative refractive power force generally have a small angle of view. Telephoto-type lenses are often used with high-magnification lenses having a relatively small angle of view. This invention exploits a telephoto-type lens system (i.e., a system comprising a positive lens group on the object side and a negative lens group on the image side) with a relatively high-magnification dry objective lens.

Figure 1:
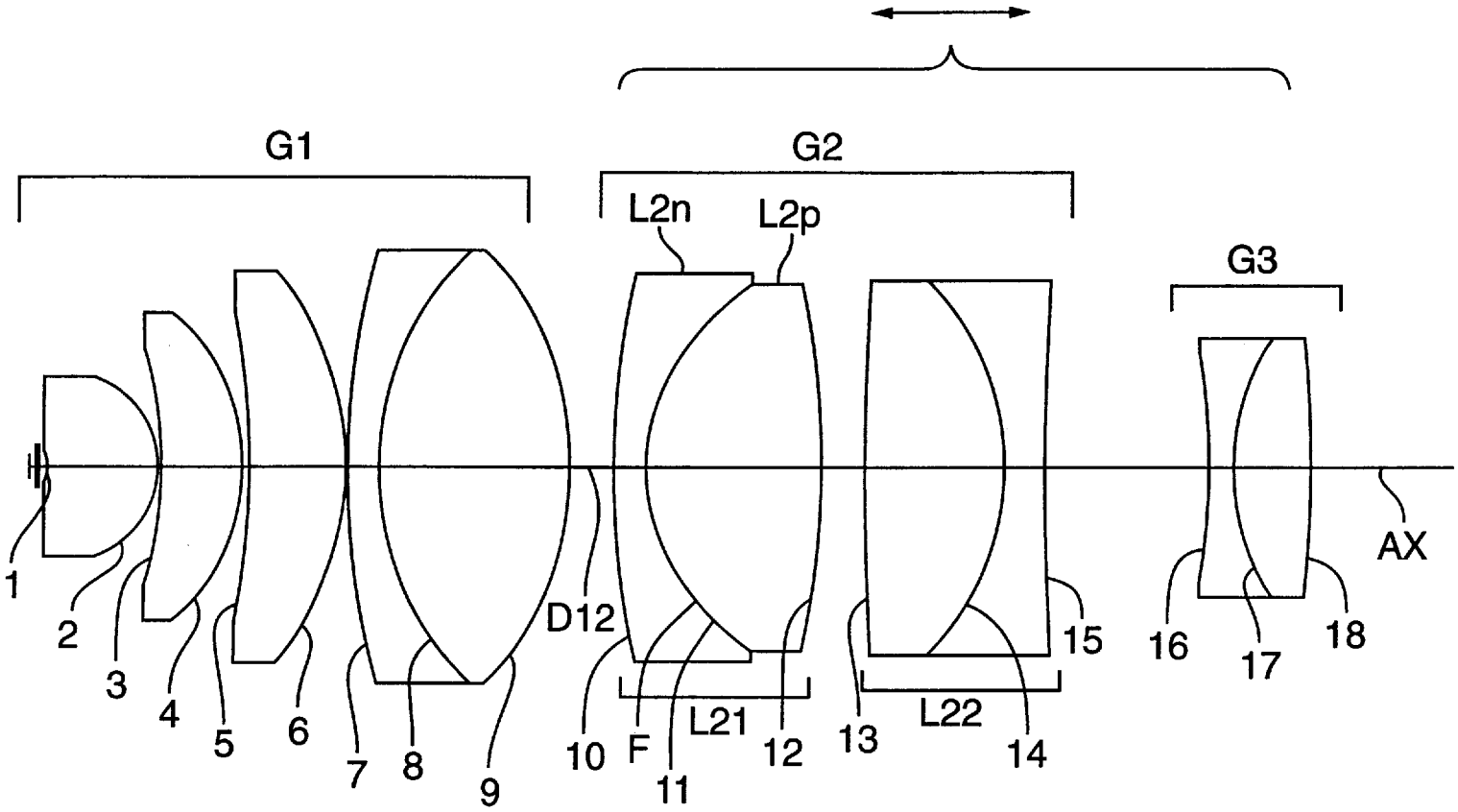
FIG. 1 is an optical diagram showing general aspects of a microscope objective lens according to the invention as well as specific aspects of Example Embodiment 1.

A representative configuration of an objective lens according to the invention, as shown in FIG. 1, comprises (starting on the object (left) side) a first lens group G1 having positive refractive power, a second lens group G2 having positive refractive power, and a third lens group G3 having negative refractive power.

The second lens group G2 comprises a first cemented lens L21 having positive refractive power and including a negative lens L2n cemented to a positive lens L2p. The first cemented lens L21 has a cemented surface 11 having a strongly negative refractive power. (The power is negative even though the cemented surface has a positive curvature radius because $n_{L21>nL22}$.) The second lens group G2 also comprises a second cemented lens L22 having negative refractive power. The second cemented lens L22 has a cemented surface 14 having a positive refractive power.

The second lens group G2 and the third lens group G3 are regarded as "corrective" lens groups. Within the second and third lens groups, the cemented surface formed by cementing the lens L2n to L2p is termed the "F surface" which is a term used to denote a cemented surface having a strongly negative refractive power. Generally, by adjusting the height of an entering ray in relation to the F surface, variations in spherical aberration arising from variability in the thickness of the cover glass are corrected.

As indicated above, the F surface is located in a corrective lens group. By moving the corrective lens group along the optical axis, the F surface is also moved. Thus, the height of the entering ray can be adjusted in relation to the F surface. This, in turn, permits various aberrations (especially spherical aberrations) arising from variability in the thickness of the cover glass to be corrected.

Spherical aberration is proportional to the height (i.e., lateral displacement from the optical axis) of the ray. The present invention allows a reduction in the amount of axial distance the corrective lens group has to move in order to increase the available diameter of the F surface.

Objective lenses according to the invention also satisfy the following conditional expressions:

$$0.33<n_{2n}-n_{2p} \quad (1)$$

$$0.02<<D_{12}/f<1.3 \quad (2)$$

wherein $n_{2n}$ is the refractive index (relative to the D-line) of the negative lens L2n, $n_{2p}$ is the refractive index (relative to the D-line) of the positive lens L2p, $D_{12}$ is the axial distance, in air, between the first lens group G1 and the second lens group G2, and f is the focal length for the entire objective lens system.

The distance $D_{12}$ between the first lens group G1 and the second lens group G2 refers to the distance, along the optical axis between the surface in the first lens group G1 that is closest to the image side and the surface in the second lens group G2 that is closest to the object side.

Conditional expression (1) specifies, within the second lens group G2, an optimal range for the refractive index difference between the negative lens $L_{2n}$ and the positive lens $L_{2p}$. These two lenses are cemented together to form the F surface. Falling below the lower limit of conditional expression (1), causes the refractive-index difference to be too small. Thus, in order to achieve satisfactory correction of spherical aberration, the curvature of the cemented F surface would have to be increased, resulting in unacceptable chromatic aberration.

Conditional expression (2) relates to the movement range of the corrective lens group (i.e., the second and third lens groups) and specifies an optimal range for the axial distance between the first and second lens groups. Exceeding the upper limit of conditional expression (2) would cause the axial distance between the first and second lens groups to be too great and the balance of lateral chromatic aberration would be lost. (Moving the corrective lens group causes a change in lateral chromatic aberration. Also, if the first and second lens groups become too close together, manufacturing problems arise.

It is desirable to correct the individual lateral chromatic aberration of the first and second lens groups as much as possible.

More specifically with each of the lens groups, the first lens group G1 includes at least one positive meniscus lens having a concave surface facing the object side. The second lens group G2 includes first and second cemented lenses L21, L22, respectively, as described above. The third lens group G3 includes at least one cemented lens.

Each of the example embodiments described below was evaluated using, on the image side of the objective lens and along the optical axis, a focusing lens. The axial air space between the objective lens and the focusing lens was 150 mm.

Also, the various aberration plots for each example embodiment were generated with the combination of the respective objective lens and the focusing lens as discussed above. However, even if the air space distance were to change slightly from 150 mm, it has been verified that almost no change arises in aberrations.

The focusing lens used to evaluate the objective lenses comprises, in order from the object side, a cemented positive lens including a biconvex lens cemented to a biconcave lens, and a cemented positive lens including a biconvex lens cemented to a biconcave lens.

Table 1, below, provides data concerning the focusing lens. In Table 1, the left-hand column pertains to surface numbers in order from the object side. The second column, designated "r", pertains to the curvature radius of each lens surface. The third column, designated "d", pertains to the axial distance between adjacent lens surfaces. The fourth column, designated "$n_d$", pertains to the refractive index (relative to the D-line; λ=587.63 nm) of each of the lens elements. The right-hand column, designated "$v_d$", pertains to the Abbe number of each of the lens elements.

TABLE 1

| Surface No. | r (mm) | d (mm) | $n_d$ | $v_d$ |
|---|---|---|---|---|
| 21 | 75.0450 | 5.1 | 1.6228 | 57.03 |
| 22 | −75.045 | 2.0 | 1.7500 | 35.20 |
| 23 | 1600.5800 | 7.5 | | |
| 24 | 50.2560 | 5.1 | 1.6676 | 42.00 |

TABLE 1-continued

| Surface No. | r (mm) | d (mm) | $n_d$ | $\nu_d$ |
|---|---|---|---|---|
| 25 | −84.5410 | 1.8 | 1.6127 | 44.41 |
| 26 | 36.9110 | | | |

EXAMPLE EMBODIMENT 1

FIG. 1 depicts specific features of an objective lens according to this example embodiment.

The first lens group G1 comprises, in order from the object side, a positive meniscus lens (surfaces 1-2) having a concave surface 1 facing the object side, a first positive meniscus lens (surfaces 3-4) with the concave surface 3 facing the object side, a second positive meniscus lens (surfaces 5-6) having a concave surface 5 facing the object side, and a cemented positive lens (surfaces 7-9) including a negative meniscus lens having a convex surface facing the object side and a biconvex lens.

In order from the object side, the second lens group G2 comprises a positive cemented lens L21 including a negative meniscus lens L2n having a convex surface 10 facing the object side and a biconvex lens, and a negative cemented lens L22 including a biconvex lens (surfaces 13-14) and a biconcave lens (surfaces 14-15). The cemented surface 11 of the positive cemented lens L21 has a negative refractive power and the cemented surface 14 of the negative cemented lens L22 has a positive refractive power.

Furthermore, in order from the object side, the third lens group G3 comprises a negative cemented lens including a biconcave lens (surfaces 16-17) and a biconvex lens (surfaces 17-18).

Table 2 presents optical data concerning this first example embodiment. In Table 2, f is the focal length of the microscope objective lens (in mm), NA is the numerical aperture, β is the magnification of a system comprising objective lens and the focusing lens of Table 1, and WD is the working distance (in mm).

In Table 2, the left-hand column pertains to surface numbers in order from the object side. The second column, designated "r", pertains to the curvature radius of each lens surface. The third column, designated "d", pertains to the axial distance between adjacent lens surfaces. The fourth column, designated "$n_d$", pertains to the refractive index (relative to the D-line; λ=587.63 nm) of each of the lens elements. The right-hand column, designated "$\nu_d$", pertains to the Abbe number of each of the lens elements.

TABLE 2 f = 5.0 mm
NA = 0.95
β = 40x
WD = 0.14 mm

| Surface No. | r (mm) | d (mm) | $n_d$ | $\nu_d$ |
|---|---|---|---|---|
| 1 | −2.1418 | 4.30 | 1.6935 | 53.76 |
| 2 | −3.7147 | 0.10 | | |
| 3 | −15.3747 | 3.30 | 1.4978 | 82.52 |
| 4 | −7.6264 | 0.15 | | |
| 5 | −34.5141 | 3.75 | 1.4978 | 82.52 |
| 6 | −12.3011 | 0.10 | | |
| 7 | 34.7490 | 1.15 | 1.6889 | 31.08 |
| 8 | 12.2878 | 7.50 | 1.4978 | 95.57 |
| 9 | −12.2878 | ($d_9 = D_{12}$ = variable) | | |
| 10 | 38.3740 | 1.15 | 1.8052 | 25.35 |
| 11 | 8.4327 | 6.80 | 1.4339 | 95.57 |
| 12 | −33.7370 | 1.80 | | |
| 13 | 203.9400 | 5.50 | 1.8052 | 25.41 |
| 14 | −10.9804 | 1.60 | 1.4339 | 95.57 |
| 15 | 124.9710 | 6.60 | | |
| 16 | −27.1710 | 1.00 | 1.7668 | 46.80 |
| 17 | 10.4119 | 3.00 | 1.5481 | 45.87 |
| 18 | −60.8420 | 150 | | |

Values of $D_{12}$ For Correction of Aberrations

| Cover Glass Thickness | Variable Distance $D_{12}$ |
|---|---|
| 0.11 mm | 0.65 mm |
| 0.17 mm | 1.785 mm |
| 0.23 mm | 3.19 mm |

Figure 2A:
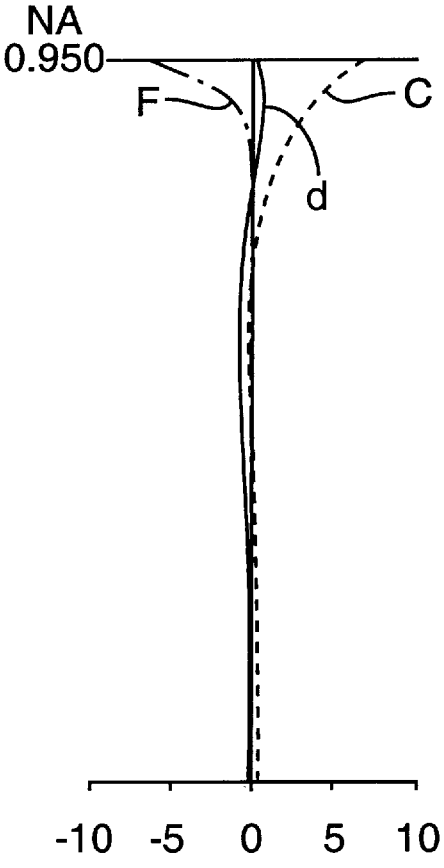
FIGS. 2(*a*)–2(*c*) are plots, for Example Embodiment 1, of spherical aberration exhibited by the objective lens when used with a cover glass of 0.11, 0.17, and 0.23 mm thickness, respectively.
Figure 2B:
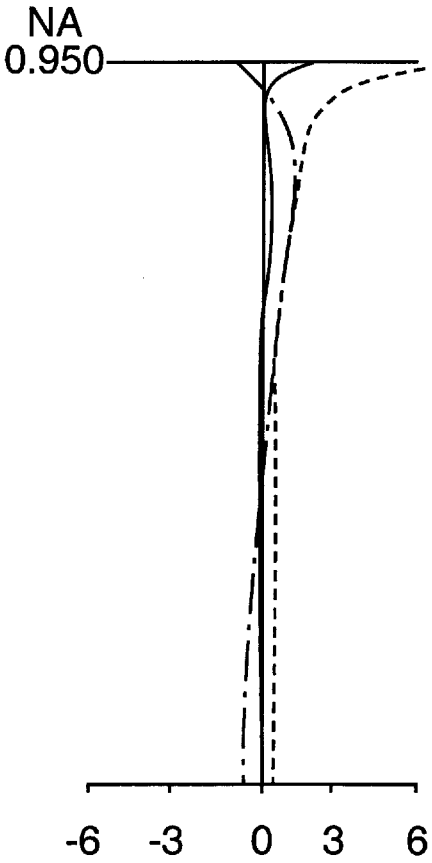
Figure 2C:
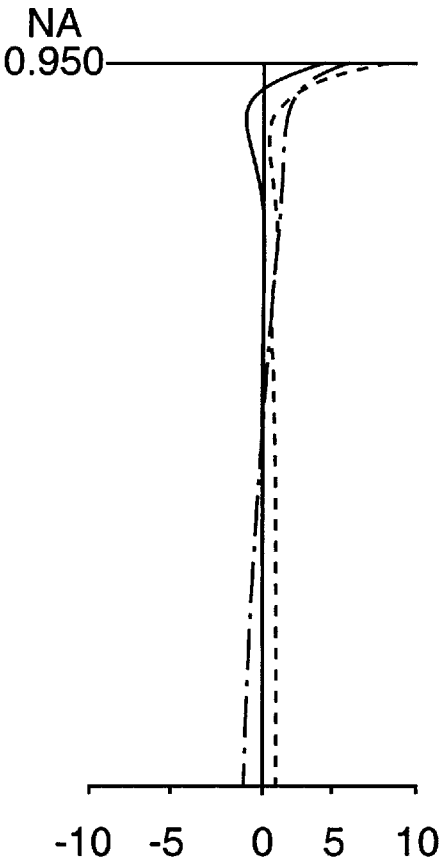

Values of Conditional Expressions (1) $n_{2n} - n_{2p} = 0.37$
(2) $D_{12}/f = 0.13 \sim 0.638$ FIGS. 2(*a*)–2(*c*) present spherical aberration plots for the first example embodiment when used with a cover glass of the stated thickness. FIG. 2(*a*) is a plot for a cover-glass thickness of 0.11 mm. FIG. 2(*b*) is a plot for a cover-glass thickness of 0.17 mm. FIG. 2(*c*) is a plot for a cover-glass thickness of 0.23 mm.

In FIGS. 2(*a*)–2(*c*), NA is the numerical aperture, d is the D-line (λ=587.63 nm), C is the C-line (λ=656.3 nm) and F is the F-line (λ=486.1 nm).

As is clear from each of the spherical aberration plots for this example embodiment, spherical aberrations arising from changes in the thickness of the cover glass are very well corrected.

EXAMPLE EMBODIMENT 2

Figure 3:
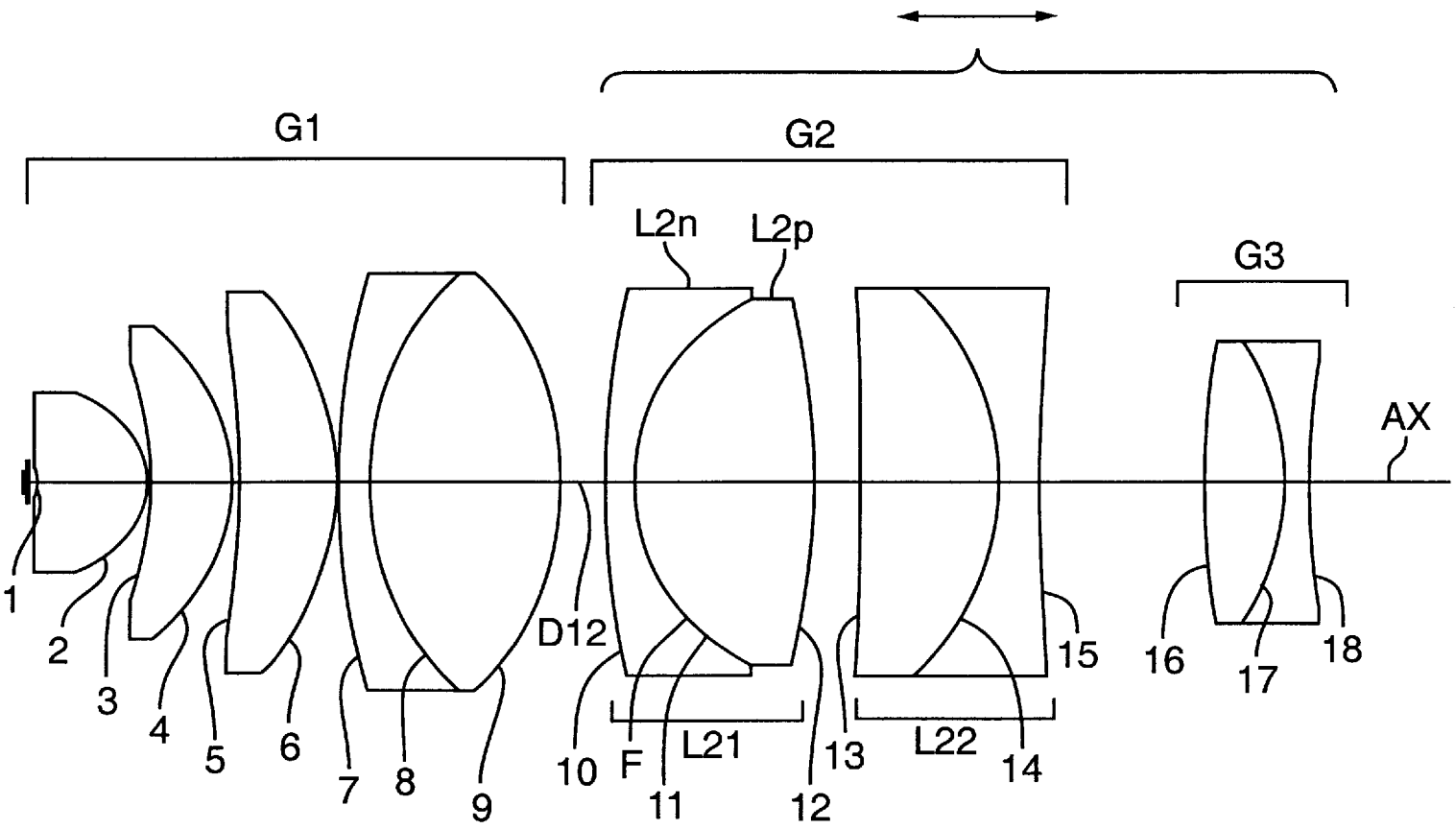
FIG. 3 is an optical diagram showing specific aspects of Example Embodiment 2.

FIG. 3 depicts specific features of an objective lens according to this example embodiment.

The first lens group G1 comprises, in order from the object side, a positive meniscus lens (surfaces 1-2) having a concave surface 1 facing the object side, a first positive menicus lens (surfaces 3-4) with the concave surface 3 facing the object side, a second positive meniscus lens (surfaces 5-6) having a concave surface 5 facing the object side, and a cemented positive lens (surfaces 7-9) including a negative meniscus lens having a convex surface facing the object side and a biconvex lens.

In order from the object side, the second lens group G2 comprises a positive cemented lens L21 including a negative meniscus lens L2n having a convex surface 10 facing the object side and a biconvex lens, and a negative cemented lens L22 including a biconvex lens (surfaces 13-14) and a biconcave lens (surfaces 14-15). The cemented surface 11 of the positive cemented lens L21 has a negative refractive power and the cemented surface 14 of the negative cemented lens L22 has a positive refractive power.

Furthermore, in order from the object side, the third lens group G3 comprises a negative cemented lens including a biconvex lens (surfaces 16-17) and a biconcave lens (surfaces 17-18).

Table 3 presents optical data concerning this second example embodiment. In Table 3, f is the focal length of the microscope objective lens (in mm), NA is the numerical aperture, β is the magnification of a system comprising objective lens and the focusing lens of Table 1, and WD is the working distance (in mm).

In Table 3, the left-hand column pertains to surface numbers in order from the object side. The second column, designated "r", pertains to the curvature radius of each lens surface. The third column, designated "d", pertains to the axial distance between adjacent lens surfaces. The fourth column, designated "$n_d$", pertains to the refractive index (relative to the D-line; λ=587.63 nm) of each of the lens elements. The right-hand column, designated "$v_d$", pertains to the Abbe number of each of the lens elements.

TABLE 3 f = 5.0 mm
NA = 0.9
β = 40x
WD = 0.14 mm

| Surface No. | r (mm) | d (mm) | $n_d$ | $v_d$ |
|---|---|---|---|---|
| 1 | −2.1461 | 4.25 | 1.6935 | 53.76 |
| 2 | −3.7862 | 0.10 | | |
| 3 | −15.7896 | 3.30 | 1.4978 | 82.52 |
| 4 | −7.6264 | 0.15 | | |
| 5 | −38.7484 | 3.75 | 1.4978 | 82.52 |
| 6 | −12.2561 | 0.10 | | |
| 7 | 34.7490 | 1.20 | 1.6889 | 31.08 |
| 8 | 12.2881 | 7.50 | 1.4978 | 95.57 |
| 9 | −12.2933 ($d_9$ = $D_{12}$ = variable) | | | |
| 10 | 43.1326 | 1.15 | 1.8052 | 25.35 |
| 11 | 8.4532 | 6.80 | 1.4339 | 95.57 |
| 12 | −32.0003 | 1.80 | | |
| 13 | −411.5836 | 5.50 | 1.8052 | 25.41 |
| 14 | −10.5541 | 1.60 | 1.4339 | 95.57 |
| 15 | 132.4293 | 6.60 | | |
| 16 | 41.9894 | 3.00 | 1.5481 | 45.87 |
| 17 | 10.7049 | 1.00 | 1.7668 | 46.80 |
| 18 | 29.1202 | 150 | | |

Values of $D_{12}$ For Correction of Aberrations

| Cover Glass Thickness | Variable Distance $D_{12}$ |
|---|---|
| 0.08 mm | 0.39 mm |
| 0.17 mm | 1.89 mm |
| 0.3 mm | 4.8 mm |

Figures 4A, 4B, 4C:
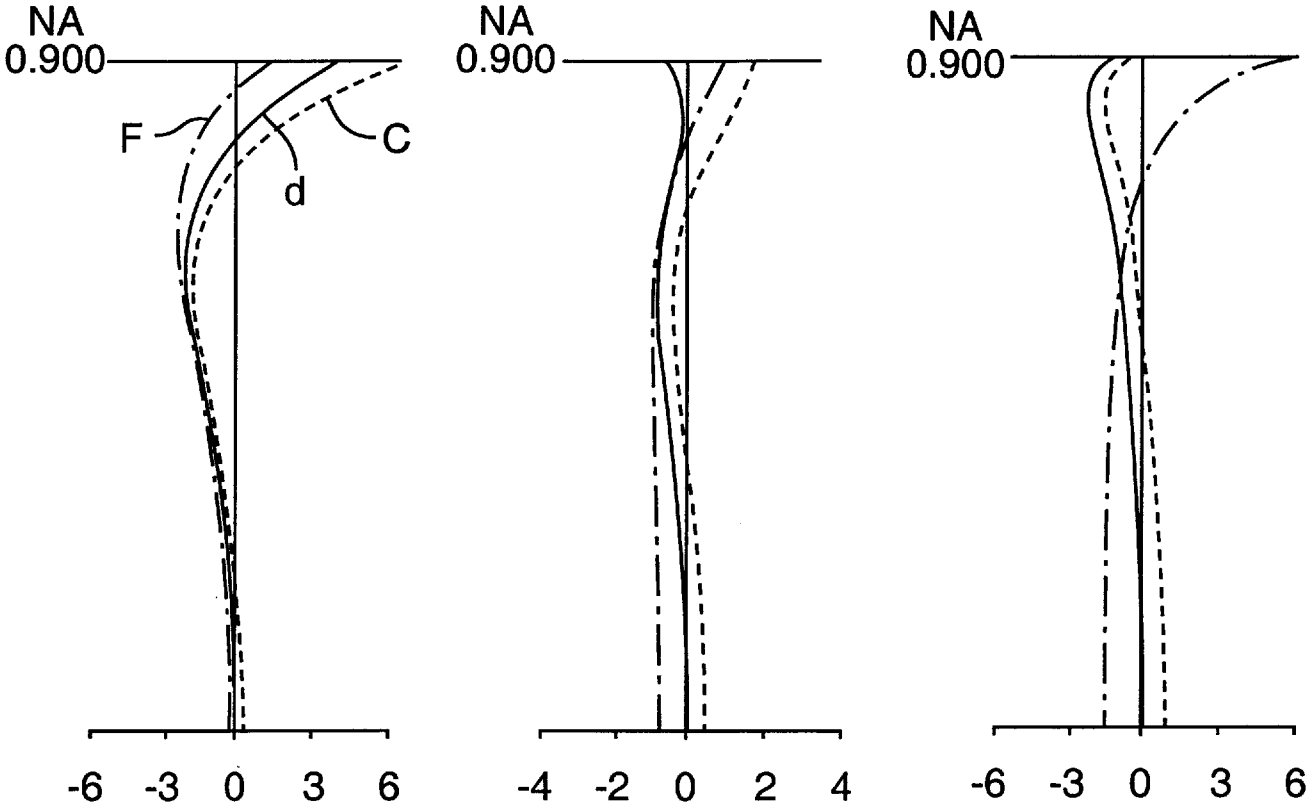
FIGS. 4(*a*)–4(*c*) are plots, for Example Embodiment 2, of spherical aberration exhibited by the objective lens when used with a cover glass of 0.08, 0.17, and 0.3 mm thickness, respectively.

Values of Conditional Expressions (1) $n_{2n} - n_{2p} = 0.37$
(2) $D_{12}/f = 0.78 \sim 0.96$ FIGS. 4(*a*)–4(*c*) present spherical aberration plots for the second example embodiment when used with a cover glass of the stated thickness. FIG. 4(*a*) is a plot for a cover-glass thickness of 0.08 mm. FIG. 4(*b*) is a plot for a cover-glass thickness of 0.17 mm. FIG. 4(*c*) is a plot for a cover-glass thickness of 0.3 mm.

In FIGS. 4(*a*)–4(*c*), NA is the numerical aperture, d is the D-line (λ=587.63 nm), C is the C-line (λ=656.3 nm) and F is the F-line (λ=486.1 nm).

As is clear from each of the spherical aberration plots for this example embodiment, spherical aberrations arising from changes in the thickness of the cover glass are very well corrected.

As described above, with a magnification of about 40× and large numerical aperture, microscope objective lenses according to this invention can provide excellent correction of various aberrations (especially spherical aberration) caused by variability in cover-glass thickness. Thus, the invention provides apochromatic microscope objective lenses that comprise few component lenses.

Whereas the invention has been described in connection with several example embodiments, it will be Understood that the invention is not limited to those example embodiments. On the contrary, the invention is intended to encompass all alternatives, modifications, and equivalents as may be included within the spirit and scope of the invention as defined by the appended claims.

What is claimed is:

1. A microscope objective lens comprising, on an optical axis from the object side to the image side:

(*a*) a first lens group (G1) having a positive refractive power, a second lens group (G2) having a positive refractive power, and a third lens group (G3) having a negative refractive power;

(*b*) the first lens group (G1) comprising first, second, and third positive meniscus lenses each having a concave surface facing the object side;

(*c*) the second lens group (G2) comprising a first cemented lens (L21) including a negative lens (L2n) cemented to a positive lens (L2p) and a cemented surface having a negative refractive power, and a second cemented lens (L22) including a cemented surface having a positive refractive power;

(*d*) the third lens group (G3) comprising a cemented lens consisting of a biconcave lens and a biconvex lens;

(*e*) the second and third lens groups being movable along the optical axis relative to the first lens group so as to correct aberrations arising as a result of using the objective lens with a cover glass having variable thickness; and (*f*) the lens satisfying the following conditional expressions:

$$0.33 < n_{2n} - n_{2p}$$

$$0.02 < (D_{12})/f < 1.3$$

wherein $n_{2n}$ is the refractive index (relative to the D-line) of the negative lens (L2n), $n_{2p}$ is the refractive index (relative to the D-line) of the positive lens (L2p), ($D_{12}$) is the axial air space between the first lens group (G1) and the second lens group (G2), and f is the focal length of the objective lens.

2. The microscope objective lens of claim 1, having a mangification of 40×.

3. The microscope objective lens of claim 1, further having the following characteristics:

(*a*) a focal length f=5.0 mm (*b*) a numerical aperture NA=0.95

(*c*) a magnification β=40×

(*d*) a working distance WD=0.14 mm (*e*) surfaces, curvature radii (r), inter-surface axial distances (d), indices of refraction ($n_d$), and Abbe numbers ($v_d$), as follows:

| Surface No. | r (mm) | d (mm) | $n_d$ | $v_d$ |
|---|---|---|---|---|
| 1 | −2.1418 | 4.30 | 1.6935 | 53.76 |
| 2 | −3.7147 | 0.10 | | |
| 3 | −15.3747 | 3.30 | 1.4978 | 82.52 |
| 4 | −7.6264 | 0.15 | | |
| 5 | −34.5141 | 3.75 | 1.4978 | 82.52 |
| 6 | −12.3011 | 0.10 | | |
| 7 | 34.7490 | 1.15 | 1.6889 | 31.08 |
| 8 | 12.2878 | 7.50 | 1.4978 | 95.57 |

-continued

| Surface No. | r (mm) | d (mm) | $n_d$ | $\nu_d$ |
|---|---|---|---|---|
| 9 | −12.2878 | ($d_9 = D_{12}$ = variable) | | |
| 10 | 38.3740 | 1.15 | 1.8052 | 25.35 |
| 11 | 8.4327 | 6.80 | 1.4339 | 95.57 |
| 12 | −33.7370 | 1.80 | | |
| 13 | 203.9400 | 5.50 | 1.8052 | 25.41 |
| 14 | −10.9804 | 1.60 | 1.4339 | 95.57 |
| 15 | 124.9710 | 6.60 | | |
| 16 | −27.1710 | 1.00 | 1.7668 | 46.80 |
| 17 | 10.4119 | 3.00 | 1.5481 | 45.87 |
| 18 | −60.8420 | 150 | | |

4. The microscope objective lens of claim 1, wherein the first lens group (G1) further comprises a cemented lens including a negative meniscus lens cemented to a biconvex lens, the cemented lens being situated imagewise of the first, second, and third positive meniscus lenses.

5. The microscope objective lens of claim 1, exhibiting a numerical aperature of at least 0.85.

6. The microscope objective lens of claim 1, wherein the first lens group (G1) further comprises a cemented lens including a negative meniscus lens cemented to a biconvex lens, the cemented lens being situated imagewise of the first positive meniscus lens.

7. The microscope objective lens of claim 1, wherein the second cemented lens (L22) in the second lens group (G2) comprises a biconvex lens cemented to a biconcave lens.

8. The microscope objective lens of claim 1, further having the following characteristics:

(*a*) a focal length f=5.0 mm (*b*) a numerical aperture NA=0.9

(*c*) a magnification β=40×

(*d*) a working distance WD=0.14 mm (*e*) surfaces, curvature radii (r), inter-surface axial distances (d), indices of refraction ($n_d$), and Abbe numbers ($\nu_d$), as follows:

| Surface No. | r (mm) | d (mm) | $n_d$ | $\nu_d$ |
|---|---|---|---|---|
| 1 | −2.1461 | 4.25 | 1.6935 | 53.76 |
| 2 | −3.7862 | 0.10 | | |
| 3 | −15.7896 | 3.30 | 1.4978 | 82.52 |
| 4 | −7.6264 | 0.15 | | |
| 5 | −38.7484 | 3.75 | 1.4978 | 82.52 |
| 6 | −12.2561 | 0.10 | | |
| 7 | 34.7490 | 1.20 | 1.6889 | 31.08 |
| 8 | 12.2881 | 7.50 | 1.4978 | 95.57 |
| 9 | −12.2933 | ($d_9 = D_{12}$ = variable) | | |
| 10 | 43.1326 | 1.15 | 1.8052 | 25.35 |
| 11 | 8.4532 | 6.80 | 1.4339 | 95.57 |
| 12 | −32.0003 | 1.80 | | |
| 13 | −411.5836 | 5.50 | 1.8052 | 25.41 |
| 14 | −10.5541 | 1.60 | 1.4339 | 95.57 |
| 15 | 132.4293 | 6.60 | | |
| 16 | 41.9894 | 3.00 | 1.5481 | 45.87 |
| 17 | 10.7049 | 1.00 | 1.7668 | 46.80 |
| 18 | 29.1202 | 150 | | |

* * * * *